July 3, 1956  P. A. J. BAILLARD ET AL  2,753,106
DETACHABLE HANDLE
Filed Nov. 28, 1952
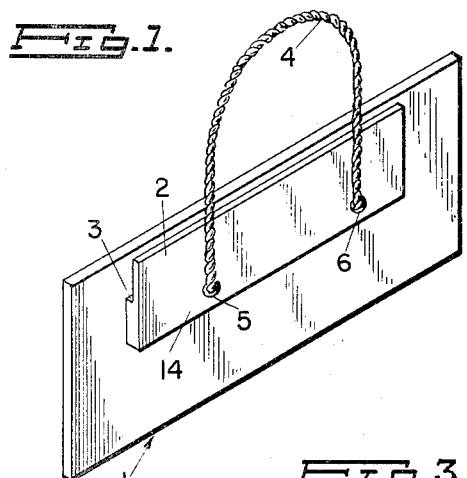
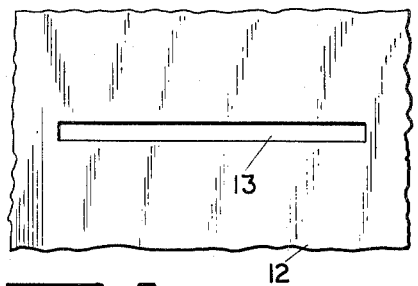
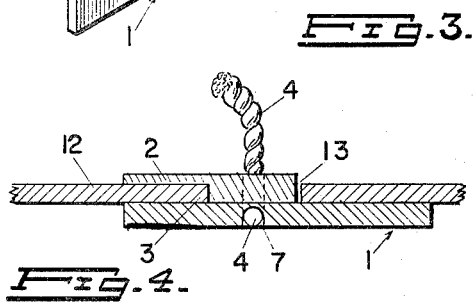
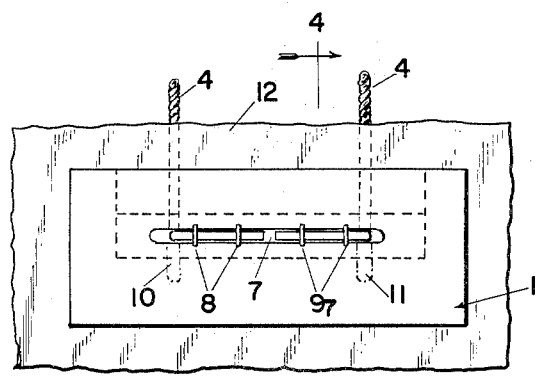
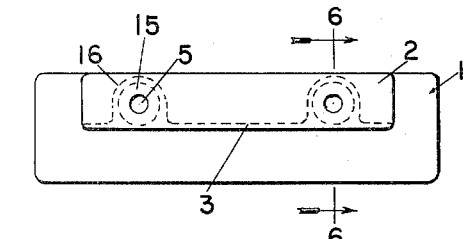
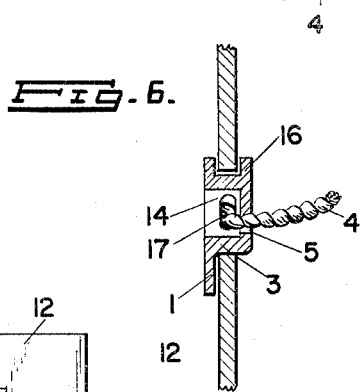
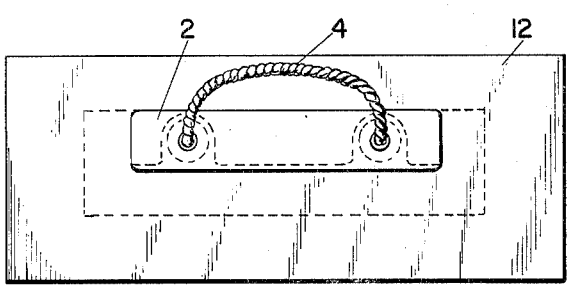
INVENTOR.
Pierre Auguste Joseph Baillard.
Georges Bardin.
BY
Maxwell E. Sparrow.
ATTORNEY.

United States Patent Office 2,753,106
Patented July 3, 1956

2,753,106

DETACHABLE HANDLE

Pierre Auguste Joseph Baillard, Le Chesnay, and Georges Bardin, Tournus, France

Application November 28, 1952, Serial No. 323,002

Claims priority, application France November 29, 1951

7 Claims. (Cl. 229—52)

An object of this invention is a detachable handle which may be used in combination with any packing and more particularly but not exclusively with cardboard packings, wood sheet packings or mixed wood and cardboard packings.

It will be obvious that these materials are given only by way of non limitative examples and it is within the scope of the invention to use this handle whatever may be the shape, volume and material of the packing considered.

The handle according to the invention comprises a support plate to be placed inside the packing and a longitudinal rib protruding from said plate.

According to a convenient type of embodiment, the handle also comprises a second support plate placed on the outside of the packing, and associated with the rib, thus providing a groove in which is housed the wall of the packing.

The seizing element, in both cases, consists of a loop of preferably flexible material associated with the device just described.

As results from the previous definition, the handle according to the invention is removable, it can thus be manufactured in mass production independently of the packing, and be adapted to any type of packing, on the only condition of providing in one wall of the latter a sufficient aperture for the passage of the rib and possibly of the outer plate. Simultaneously the two plates used in the making of this handle constitute a re-inforcement for the packing and it is, therefore, within the scope of the invention to give the plate inside the packing a length which may reach that of the side of the packing which cooperates with it.

Of course this handle and particularly the two plates may be manufactured out of any material whatsoever, in one piece or as a plurality of elements assembled together in any manner.

Other features of the invention will appear from the following description when read with reference to the appended drawings given by way of non limitative examples, wherein:

Figure 1 represents, in perspective, one type of embodiment of the invention;

Figure 2 represents, in partial view, the wall of a packing prepared for receiving the handle of figure 1;

Figure 3 is a view from inside, showing the handle mounted on the packing.

Figure 4 is a section through IV—IV in Figure 3.

Figure 5 shows a modification of the handle according to the invention.

Figure 6 is a view, in section, along the axis YY' of the handle according to Figure 5, mounted on a packing, finally Figure 7 is an outside view of this same handle, mounted.

As shown in Figure 1, the handle according to the invention consists of a first plate 1 which will be housed inside the packing. This plate, which may be made of any material, thus also plays the part of a stiffening or reinforcing element for the packing in question; it may be given, to this effect, any dimensions and any thickness.

On this plate 1 is secured a second plate 2 which will be outside the packing. Said plate 2 is provided with a rabbet 3, providing between it and the plate 1 a housing which has a U-shaped section for receiving the wall of the packing. In order to obtain this shape, a strip could also be inserted, simply between the two plates 1 and 2. It will be obvious, also, that these three elements may be obtained in one piece, for instance by molding from a plastic material.

The seizing element is constituted here by a certain length of a flexible material 4 which goes through apertures 5, 6 provided through the two plates and which folds back on the inner face of plate 1 to be immobilized thereon.

In the type of embodiment shown in the drawing, the inner face of the plate 1 is provided with a recess 7 and the two ends of the seizing element 4 are folded back in this recess and immobilized as for instance by riveted hooks such as 8, 9. The two ends of element 4 in question may also be cemented in said groove; similarly, the latter may be replaced by two grooves such as 10, 11, perpendicular on the large side of the plate 1.

In a general manner, any known means may be used for stopping the two ends of the element 4 and for securing them with respect to the plate 1. Finally, it should be understood that said element 4, constituting the handle proper may have any constitution whatever.

This handle is meant to be mounted on a panel 12 forming one side of the package. There is provided, in this panel, an aperture 13 having the same length as the plate 2 and the width of which is substantially equal to the distance separating the bottom of the rabbet 3 from the lower large side 14 of the plate 2. The edges of this aperture which, for instance, is stamped off, may be reinforced in a known manner. For placing the handle in position, it is sufficient, therefore, to pass through the slot 13 the seizing element 4 and plate 2 and to reassemble the whole for the panel 12 to come and nest inside the rabbet 3; this is the position shown in Figure 4 of the drawing.

In the handle according to the previous figures, the rib connecting the two plates must, necessarily, have a sufficient height to make it possible to bore holes therein for passing the string. Consequently, the slot which should be provided in the wall of the packing and which should obviously have a height at least equal to the height of said rib, should itself be high enough. The modification according to Figures 5 and 7 is characterized, on the other hand, by the fact that it comprises, in the groove, at least two shoulders, constituting extensions of the rib, and which are provided with holes for passing the loop which is thus above the level of the bottom of the groove.

The loop no longer having to go through the thickness of the rib, the latter needs not have an important height, and may be given a very small height, simply compatible with the strength of the whole. Due to this fact, the height of the aperture to be provided in the wall of the packing for passing the handle may be cut down to a minimum value, which does not jeopardize the strength of the packing; this aperture, however, should offer notches for housing the above mentioned shoulders.

Said shoulders may offer, in line with the passage holes for the loop, recesses, in which may be housed, for instance, knots for immobilizing the string or thong constituting the loop; these knots, thus, do not form a troublesome protrusion inside the packing.

In these Figures 5 to 7, 1 designates, as formerly, the inner plate, and 2 the outer plate, connected through the rib 3. In the groove formed between the plates 1 and 2 are arranged two shoulders 16, provided with holes 5, extended by cut-out portions 15 in which are housed the knots 17 of the string 4. The holes 5 are thus above the level of the bottom of the groove between the plates 1 and 2. As formerly, 12 designates the wall of the packing which fits in the groove between the plates 1 and 2.

It is specifically pointed out that the dimensions, appearance and material constituting the handle according to the invention may be of any type whatsoever; in particular, it may be made partly or completely of metal or wood, or opaque or transparent plastic material and of any colour.

Similarly, the thong forming the handle proper may be of any material: string, cord, twisted or not, tape, leather, synthetic material.

Finally, the plates, instead of being plane, as shown in the figures, may be curved so as to be capable of being adapted to a packing having a circular shape or other.

What is claimed is:

1. A detachable handle for a container having a slot formed in one wall thereof, said handle comprising a pair of parallel spaced plates, a rib secured between said plates and combining therewith to define a groove, said groove being adapted to receive a wall portion of said container when one of said plates is inserted through said slot, and a carrying loop secured to said pair of plates and extending outwardly from said one plate, said rib being engageable throughout the length with an edge surface of said slot and the other of said plates having its inner face engageable with said one wall to minimize unit forces applied to said container when the latter is carried by said loop.

2. A handle according to claim 1, wherein said plates and rib are provided with spaced apertures for securing said loop below the bottom of said groove.

3. A handle according to claim 1, wherein said plates are curved conformably to the contour of a non-rectilinear container.

4. A handle according to claim 1, in combination with spaced shoulders formed in said groove and provided with apertures for securing said loop above the bottom of said groove.

5. A handle according to claim 4, wherein said shoulders are formed with recesses opening outwardly through the other of said plates for receiving stop means on said loop.

6. A detachable handle for a container having a slot formed in one wall thereof, said handle comprising a first plate, a rib on said first plate spaced between the upper and lower edges thereof, a second plate arranged in parallel spaced relation with respect to said first plate and having its lower edge secured to said rib, said second plate being insertable outwardly through said slot, and a carrying loop secured to and extending outwardly from said second plate.

7. A detachable handle for a container having a slot formed in one wall thereof, said handle comprising a pair of parallel spaced plates, one of said plates being larger than the other, a rib extending along a marginal portion of the smaller of said plates and secured between said pair of plates, said rib combining with said pair of plates to define an upwardly opening groove for receiving a wall portion of said container when said smaller plate is inserted through said slot, and a carrying loop secured to and extending outwards from said smaller plate, whereby said rib is engageable throughout its entire length with an edge surface of said slot and the larger of said plates is engageable with said one container wall to minimize unit forces applied to said container when the latter is carried by said loop.

References Cited in the file of this patent

UNITED STATES PATENTS

| 1,714,162 | Deubner | May 21, 1924 |
| 2,612,309 | Potts | Sept. 30, 1952 |

FOREIGN PATENTS

| 541,389 | France | May 2, 1922 |
| 259,274 | Switzerland | Jan. 15, 1949 |
| 500,407 | Belgium | Mar. 28, 1952 |